US011983809B2

(12) United States Patent
Michal

(10) Patent No.: US 11,983,809 B2
(45) Date of Patent: May 14, 2024

(54) A-BUFFER DYNAMIC ALLOCATION

(71) Applicant: Rockwell Collins, Inc., Cedar Rapids, IA (US)

(72) Inventor: Russell Michal, Cedar Rapids, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 198 days.

(21) Appl. No.: 17/751,096

(22) Filed: May 23, 2022

(65) Prior Publication Data
US 2023/0377242 A1 Nov. 23, 2023

(51) Int. Cl.
G06T 15/00 (2011.01)
G06T 15/50 (2011.01)

(52) U.S. Cl.
CPC .......... *G06T 15/005* (2013.01); *G06T 15/503* (2013.01); *G06T 2210/52* (2013.01); *G06T 2210/62* (2013.01)

(58) Field of Classification Search
CPC . G06T 15/005; G06T 15/503; G06T 2210/52; G06T 2210/62; G06F 9/5016; G06F 9/52
See application file for complete search history.

(56) References Cited

U.S. PATENT DOCUMENTS

| 6,204,859 | B1 | 3/2001 | Jouppi et al. |
| 6,989,840 | B1 | 1/2006 | Everitt et al. |
| 8,040,349 | B1 | 10/2011 | Danskin |
| 8,081,181 | B2 | 12/2011 | Peeper |
| 8,941,669 | B1* | 1/2015 | Moreton ............... G06F 9/505 345/503 |
| 2005/0041031 | A1* | 2/2005 | Diard ..................... G09G 5/393 345/505 |
| 2014/0306971 | A1 | 10/2014 | Frascati et al. |
| 2016/0055608 | A1* | 2/2016 | Frascati ............... G06T 15/005 345/522 |
| 2018/0165788 | A1* | 6/2018 | Balci ........................ G09G 5/00 |
| 2022/0284538 | A1* | 9/2022 | Kim .......................... G06T 1/20 |

OTHER PUBLICATIONS

Craig M. Wittenbrink ED, Association for Computing Machinery: "R-buffer", Proceedings Graphics Hardware 2001. ACM SIGGRAPH/EUROGRAPHICS Workshop on Graphics Hardware; ACM, New York, NY, US, Aug. 1, 2001, pp. 73-80.
Extended European Search Report dated Oct. 25, 2023; European Application No. 23173431.0.
(Continued)

*Primary Examiner* — Ryan R Yang
(74) *Attorney, Agent, or Firm* — Suiter Swantz IP

(57) ABSTRACT

A method for order independent transparency is described. The method includes rendering objects into an A-buffer by a GPU. A CPU performs dynamic memory allocation to allocate the A-Buffer based on a size of the previous frames A-Buffer. By allocating the A-Buffer based on a previous frame, a GPU-to-CPU synch point may be removed. Depending upon a size of the A-Buffer, not all objects may fit into the A-Buffer. The method may additionally include creating an R-Buffer with the identification of partially stored objects and removing the partially stored objects from the A-Buffer prior to blending.

20 Claims, 12 Drawing Sheets

(56) References Cited

OTHER PUBLICATIONS

Loren Carpenter: "The A-buffer, an antialiased hidden surface method", Computer Graphics and Interactive Techniques, ACM 2 Penn Plaza, Suite 701, New York, NY 10121-0701 USA, Jan. 1, 1984, pp. 103-108.

Maule et al., "Memory-Efficient Order-Independent Transparency with Dynamic Fragment Buffer," 2012 25th SIBGRAPI Conference on Graphics, Patterns and Images, 2012, pp. 134-141, doi: 10.1109/SIBGRAPI.2012.27.

Ragan-Kelley et al., Decoupled sampling for graphics pipelines. ACM Trans. Graph. 30, 3, Article 17 (May 2011), 17 pages. DOI:https://doi.org/10.1145/1966394.1966396.

* cited by examiner

100

A-BUFFER DYNAMIC ALLOCATION

TECHNICAL FIELD

The present invention generally relates to computer graphics processing, and more specifically to rendering transparent objects.

BACKGROUND

Transparent objects provide a challenge in computer graphics rendering. The GPU should render all objects in parallel for maximum performance. However, transparent objects must be rendered sequentially because the order effects the resulting image. Order independent transparency (OIT) refers to a computer graphics rendering of transparent objects. One technique of OIT rendering involves storing rasterized data in a per pixel linked list (A-Buffer), instead of rendering directly to the display screen. The A-Buffer is then sorted and blended for display on the screen. The amount of memory for the A-Buffer (e.g., the size) must be known and allocated before rendering. Allocating too much memory to the A-Buffer limits performance by reducing the available memory for the rest of the rendering process. Therefore, it is desirable to only allocate a minimum required amount of memory.

One method to address A-buffer size when rendering transparent objects is to draw the scene, and then check the A-Buffer size against the scene to see if the size was large enough for the rendered objects. If the size was not large enough, additional memory is allocated to the A-Buffer and the scene is redrawn in a second pass. This process involves the GPU sending information to the CPU about how much data was written to the A-Buffer. This introduces a GPU-to-CPU sync point, causing the CPU to wait for the GPU to finish rendering the scene. By waiting for the GPU to finish rendering, frame time and performance may be negatively impacted. In addition, if the A-buffer was not large enough the A-buffer must be resized and the scene re-rendered, again negatively impacting performance.

Another method to address A-buffer size when rendering transparent objects is to size the A-Buffer by rendering the scene with an initial pass (i.e., a geometry pass). In the initial pass, object geometry and size are recorded in the A-Buffer, without storing or computing visual data (e.g., color, normals, etc.) or blending the objects. The GPU then computes the A-Buffer size and sends it to the CPU. The CPU then resizes the A-Buffer, if appropriate. Once the A-Buffer size has been changed, the GPU then fully renders the scene into the A-Buffer in a second pass.

Both methods of addressing buffer size when rendering transparent objects described above require an additional sync point, reducing the performance of the application. Therefore, it would be advantageous to provide a device, system, and method that addresses these issues.

SUMMARY

A method is disclosed, in accordance with one or more embodiments of the present disclosure. In one illustrative embodiment, the method includes queuing, by a centralized processing unit (CPU), a first rendering command for a first plurality of objects. In another illustrative embodiment, the method includes causing a graphics processing unit (GPU) to store rasterized data of the first plurality of objects into a first A-Buffer, sort the first A-Buffer, and render a first frame based on the first A-Buffer. In another illustrative embodiment, the centralized processing unit is free to process other commands while the GPU is rendering the first frame. In another illustrative embodiment, the method includes allocating, by the CPU, a size of a second A-buffer based on the size of the first A-Buffer from the first frame. In another illustrative embodiment, the CPU receives the size of the first A-buffer from the GPU during the second frame and determines the size for the second A-buffer such that the GPU does not wait for the size of the second A-Buffer during the second frame. In another illustrative embodiment, the method includes queuing, by the CPU, a second rendering command for a second plurality of objects. In another illustrative embodiment, the method includes causing the GPU to store rasterized data of the second plurality of objects into a second list stored in the second A-buffer, store an identification of one or more objects of the second plurality of objects into a removed buffer (R-buffer) when the one or more objects are partially stored in the second A-Buffer, sort the second list, and render a second frame using the second sorted list; wherein one or more objects of the second plurality of objects are removed from the second A-Buffer prior to rendering the second frame. In another illustrative embodiment, the CPU is free to process one or more other commands while the GPU is rendering the second frame.

A system is disclosed, in accordance with one or more embodiments of the present disclosure. In one illustrative embodiment, the system includes a graphics processing unit (GPU) including Video Memory. In another illustrative embodiment, the system includes a centralized processing unit (CPU). In another illustrative embodiment, the system includes a display. In another illustrative embodiment, the system is configured to perform the method described above.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1A:
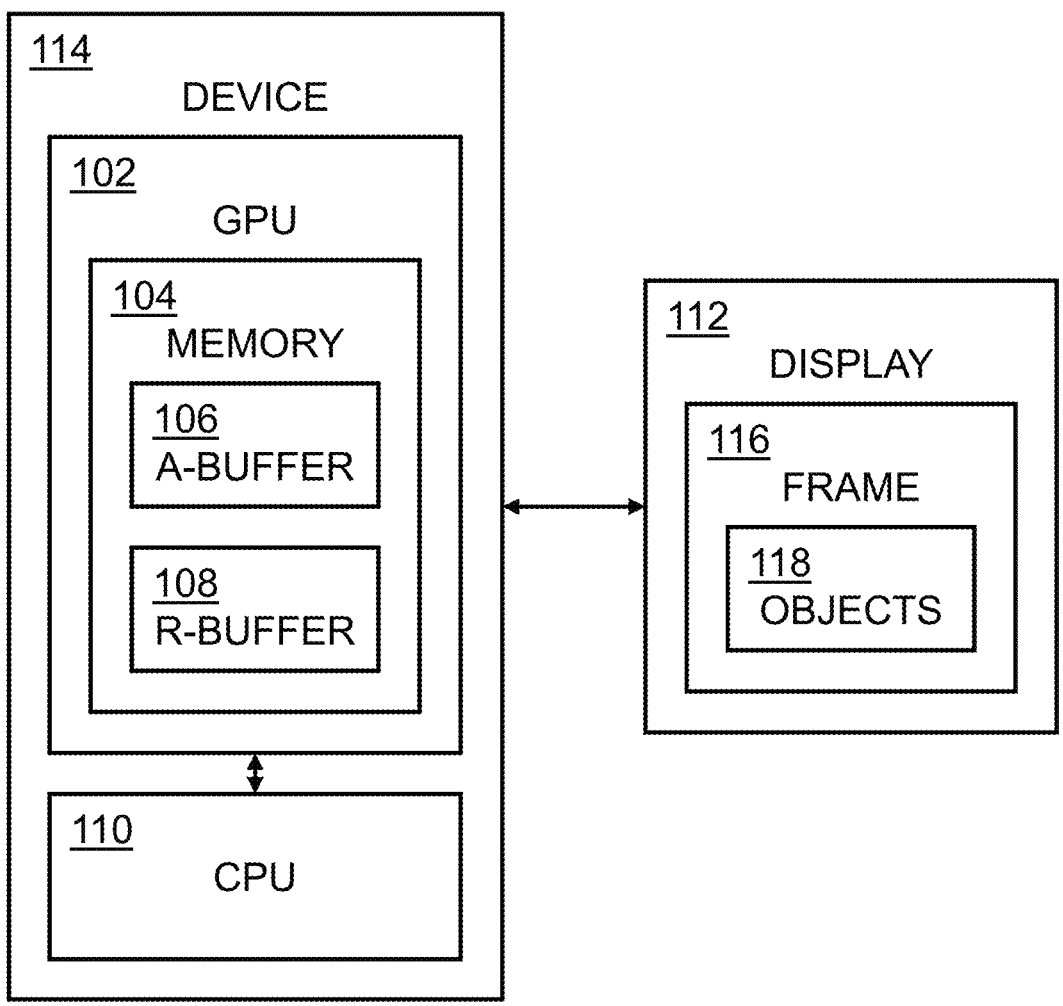
FIG. 1A depicts a simplified schematic diagram of a system configured to dynamically allocate memory to an A-Buffer, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. A technique is described that may resize an A-Buffer to an appropriate size, without wasting memory or performance. Embodiments of the present disclosure are generally directed to a method of A-Buffer dynamic memory allocation (A-Buffer DMA) for the A-Buffer of a graphics processing unit (GPU). In this approach, the size of the A-buffer is estimated with the data from the previous frame. This data is previously available and can be retrieved by the CPU from a GPU buffer, avoiding a sync point. The CPU can then size the A-Buffer based on the previous data and render the scene. If the new scene is larger than the old scene, then the A-Buffer may not be large enough, and objects may appear partially drawn when blended to the screen. The method may also include removing partially stored objects from the A-Buffer prior to blending, thereby preventing partially drawn objects from being displayed in the frame.

Referring now to FIG. 1A, a system 100 is described in accordance with one or more embodiments of the present disclosure. The system 100 may include one or more components, such as, but not limited to, a GPU 102 (graphics processing unit), a CPU 110 (centralized processing unit), or a display 112. In some instances, the GPU 102 and the CPU 110 are housed in a computing device 114, although this is not intended to be a limitation of the present disclosure. The GPU 102 and the CPU 110 may be configured to display a sequence of frames 116 on the display 112. The frames 116 may include objects 118, such as transparent objects with an ordering based on depth values. The GPU 102 and the CPU 110 are configured to implement one or more techniques for rendering the objects 118 by an order independent transparency (OIT) technique. The objects 118 may be blended from pixel data stored in A-Buffer 106.

The GPU 102 may include memory 104 allocated to store the A-Buffer 106. The memory 104 may include any storage medium known in the art suitable for storing program instructions executable by the associated processor. For example, the memory medium may include a non-transitory memory medium. By way of another example, the memory medium may include, but is not limited to, a random-access memory (RAM) such as a video RAM (VRAM) and the like. It is further noted that memory medium may be housed in a common controller housing with the GPU. In embodiments, the memory medium may be located remotely with respect to the physical location of the GPU/CPU.

In embodiments, the memory 104 may be dynamically allocated to the A-Buffer 106 for each frame. In further embodiments, the memory 104 may also be allocated to store an R-Buffer 108. Each of the A-Buffer 106 and the R-Buffer 108 may include a size which is allocated from memory 104. The size of the A-Buffer 106 may be based on a number of factors, such as, but not limited to, the number of objects, the size of the objects, and an output resolution of the scene. As compared to the A-Buffer 106, the size of the R-Buffer 104 may be relatively small.

A number of objects 118 (also referred to herein as primitives) may be defined in a three-dimensional space. The objects 118 may be generated during one or more steps of a graphics pipeline. The CPU 110 may queue one or more rendering commands to the GPU 102 to render the objects 118 in the frame 116. The objects 118 may include various data, such as, but not limited to, color, opacity, depth value, gradients, and the like. The objects 118 may be representative of data associated with the application of the system 100. For example, the objects 118 may be representative of various game data with transparent objects. By way of another example, the objects 118 may be representative of various flight simulator data, such as, but not limited to a heads-up display, a surrounding environment and the like, although this is not intended to be limiting. The GPU 102 may receive the rendering commands and render the objects 118. In embodiments, the GPU 102 rasterizes the objects in parallel and/or rasterizes multiple pixels for each object in parallel. By rasterizing the objects, the GPU 102 may generate rasterized data which may then be stored into the A-Buffer 106. The objects 118 are thus rendered into the A-Buffer 106. The objects in the A-Buffer 106 may then be sorted and blended for generating the frame 116. One or more objects 118 may be rasterized on the display 112 in one or more frames 116. The GPU 102 may generate the frames 116 with any frame rate, such as, but not limited to, between 24 and 120 frames per second, or more.

Figure 1B:
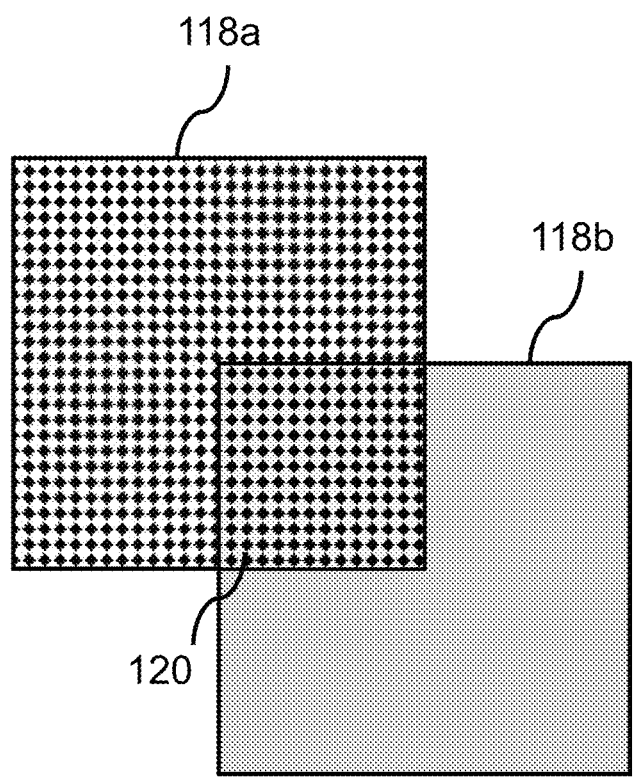
FIGS. 1B-1C depicts a frame including transparent objects with an overlapping region, in accordance with one or more embodiments of the present disclosure.
Figure 1C:
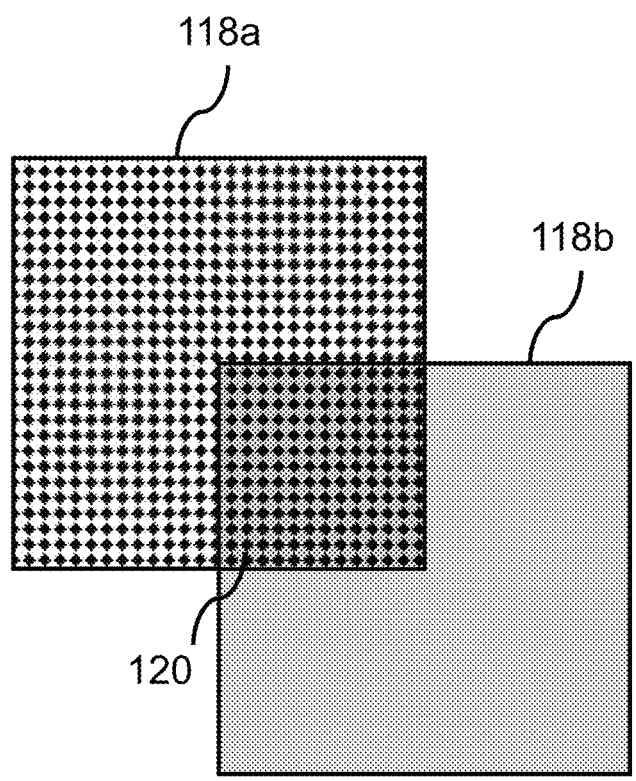

The A-buffer 106 is a spot in memory 104. The CPU 110 must tell the GPU 102 how much of the memory 104 to allocate to the A-buffer 106. The A-buffer 106 may include any data structure, such as, but not limited to, an array. The A-buffer 106 may be a buffer that contains an array stored in the memory 104 of the GPU 102. The array may include pixel data, depth data, color data, opacity data, and the like. For example, the A-Buffer 106 may include a list, such as a per-pixel linked list where the objects are rendered. The per-pixel linked list may include a number of linked lists which set forth pixels which are displayed at the same position on the display. When the objects are first rendered into the A-Buffer 106, the objects may be unsorted or otherwise not in order. When blending the objects, the order of the objects in the A-Buffer 106 matters, due to the transparency. As depicted in FIGS. 1B-1C, an object 118a and an object 118b are rendered which each include a transparency value. In FIG. 1B, the object 118a is disposed in front of the object 118b and then blended, causing an overlapping region 120 to include a first color. In FIG. 1C, the object 118b is disposed in front of the object 118a and then blended, causing the overlapping region 120 to include a second color which is different than the first color. Thus, ordering the objects 118 correctly is important to ensure an accurate rendering of the objects 118. After the GPU 102 has drawn all of the objects into the A-Buffer 106, the GPU 102 may perform a post processing pass which includes sorting the objects. The A-Buffer 106 may be sorted based on depth data. The sort may include any sorting algorithm, such as, but not limited to, an insertion sort adapted for the GPU known as register sort. The A-Buffer 106 may then be blended. The blending process may include combining the data stored in the A-Buffer 106 to achieve an image to be displayed on the display 112. As may be understood, the blending process may include any number of blending processes known in the art. The sorted and blended objects may then be rendered to the display 112.

Minimizing the amount of the memory 104 used by the GPU 102 may be advantageous in allowing the GPU 102 to initialize additional threads. Communication between the CPU 110 and the GPU 102 may cause the GPU to stop working until receiving the communication from the CPU 110 and vice versa, which may also be referred to as a CPU-to-GPU or GPU-to-CPU synch point. For example, the CPU could wait for the GPU to finish rendering and then send sizing information to the CPU. This information may be transmitted from the GPU 102 to the CPU 110 by a peripheral component interconnect express (PCI-E) bus or another interface. The CPU 110 may receive the communication, process the communication, and transmit an additional communication to the GPU 102 for allocating the size of the A-Buffer. Therefore, it is desirable to reduce the time of messages between the GPU 102 and the CPU 110.

In embodiments, the CPU 110 is configured to dynamically allocate memory for the A-Buffer 106. The amount of the memory 104 allocated to the A-Buffer 106 for the GPU may be dynamic and based on data from a previous frame which is available to a centralized processing unit (CPU). The CPU 110 may get frame data regarding the previous frame from the GPU 102. The CPU 110 does not wait for the GPU 102 while the GPU 102 is rendering the frames 116 and is free to perform any number of commands, thereby removing a synch point. The CPU 110 may then approximate a size of the next frame of the buffer. By dynamically allocating the memory, a GPU-to-CPU sync point is removed. Additionally, the transparent objects may be rendered in a single pass without the GPU requesting the CPU to increase the size of the A-Buffer and without re-rendering, thereby reducing any extra renderings by the GPU 102. The ability to remove the GPU-to-CPU sync points may improve the performance of real time rendering applications (e.g., on the order of several milliseconds per frame 116). Similarly, reducing the number of renderings may also improve the performance of real time rendering applications. Thus, A-Buffer Dynamic Memory allocation may remove performance issues that are encountered when sizing the A-Buffer 106 for order independent transparency.

In some instances, sizing the A-buffer 106 based on the previous frame may introduce one or more problems when rendering. For example, the new frame may need a larger A-buffer than the previous frame (e.g., drawing more objects in the new frame). The A-buffer 106 may thus be unable to hold all of the objects. The GPU 102 may know whether the object fits into the A-Buffer 106 based on a current size of the A-Buffer 106, the size of objects currently stored in the A-buffer 106, and the size of the new objects. However, the GPU 102 may not be able to directly allocate more memory to the A-Buffer 106. Depending upon the size of objects being rendered, the size of the A-buffer 106 from the previous frame may be insufficient, causing an overflow of the objects from the memory such that one or more of the objects 118 may be partially stored in the A-Buffer 106. If the A-buffer 106 is not large enough to hold all the objects being rendered, only a portion of the objects 118 may be stored in the memory and subsequently blended which may introduced artifacts to the frame 116.

To address the partially stored objects in the A-buffer 106, the GPU 102 may include an additional buffer stored in the memory 104. The additional buffer may be referred to as an R-Buffer 108 (Removed Buffer). The R-Buffer 108 may be created to store object identifications (IDs) for the objects which are partially stored in the A-Buffer. When the GPU 102 draws an object that doesn't fit fully into the A-Buffer 106, the object ID for the partially drawn or overflown object is added to the R-Buffer 108. When the A-Buffer is sorted, the identifications of the overflown object may be compared against the R-Buffer and the object is then not rendered/drawn on the display. For instance, the GPU may render all objects to the A-Buffer. The GPU may then compare the object IDs stored in the R-Buffer to the object IDs stored in the A-Buffer and remove the overflown objects from the A-buffer based on the R-Buffer. The GPU may then sort and blend for proper rendering without displaying the overflown object in the current frame, thereby preventing partially drawn objects from occurring in the current frame. The GPU may tell the CPU to increase the amount of memory allocated to the A-Buffer for subsequent frames thereby preventing overflow of the objects in the next frame.

The R-buffer 108 may be a relatively small buffer, when compared to the A-Buffer 106. If the overflown objects are large, then only a few of them will be partially drawn and the rest of them will be undrawn. On the other hand, if the objects are small, then only a few of them will be partially drawn and the rest of them will be fully drawn. Because of this there will only be a small number of partially drawn objects and the R-Buffer 108 does not need to be very large. The R-Buffer 108 may be sized to store any number of object IDs. In some instances, the number of objects IDs is selected based on the byte size of the object ID and the cache size of the memory 104. The object ID may include a byte size of 4-bytes. The cache size of the memory 104 may include between 32-bytes and 512-bytes, or more. In this regard, the R-Buffer 108 may store any number of object IDs, such as, but not limited to, between 8 object IDs and 128 object IDs having a byte size of 4-bytes. Thus, the number of object IDs is selected, together with the byte ID size, to align with a cache of the GPU (e.g., between 32 and 512 bytes, or more).

Performing dynamic memory allocation of the A-Buffer 106 removes the performance issues associated with the A-Buffer at the expense of overflown objects. With the addition of the R-Buffer, the GPU 102 may prevent partially drawn objects from being displayed in the current frame at the expense of a R-buffer cache overhead and 1 frame of latency. However, neither of these draw backs are noticeable in practice and frame times are significantly improved.

Figure 2A:
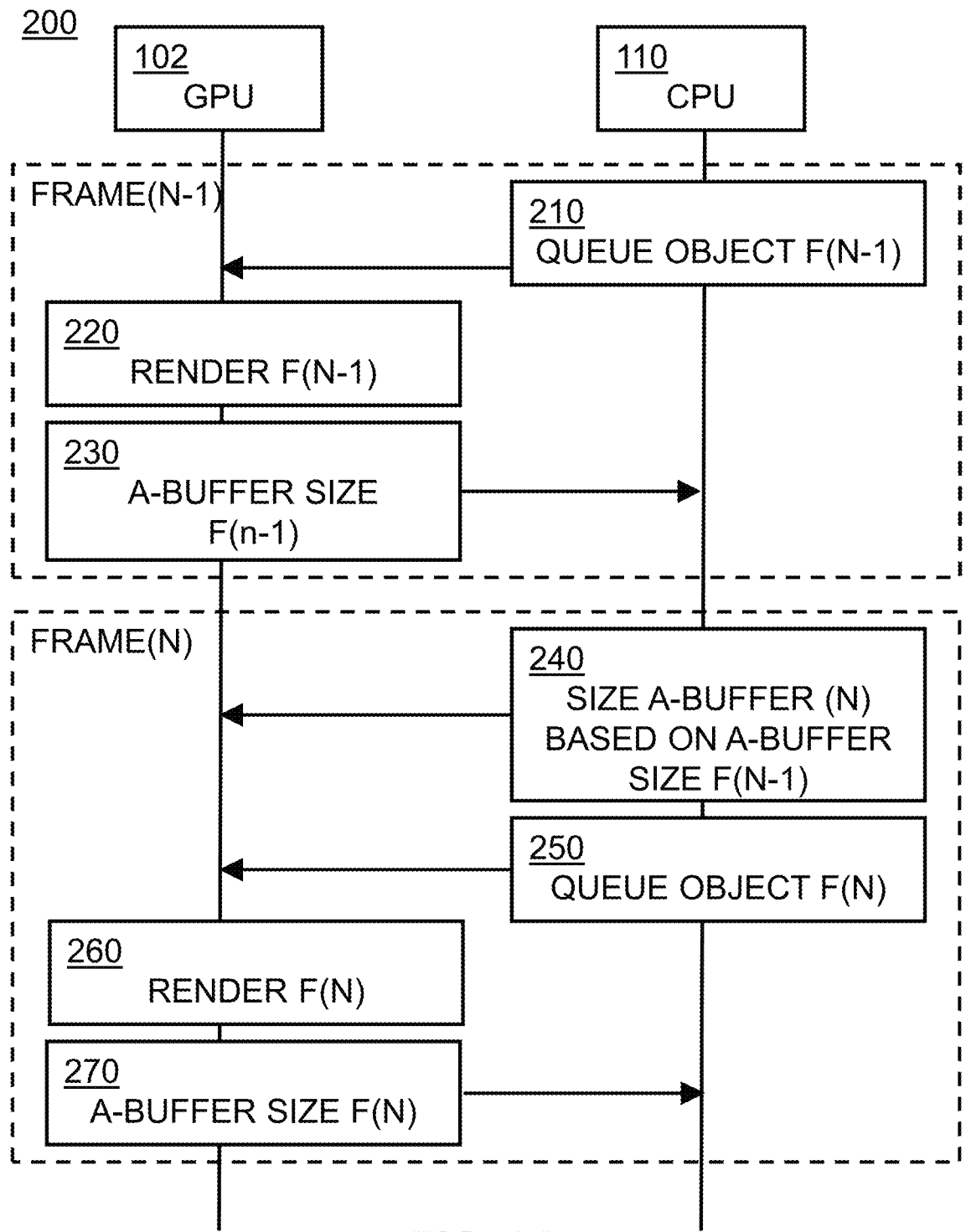
FIGS. 2A-2B depict a flow diagram of a method, in accordance with one or more embodiments of the present disclosure.
Figure 2B:
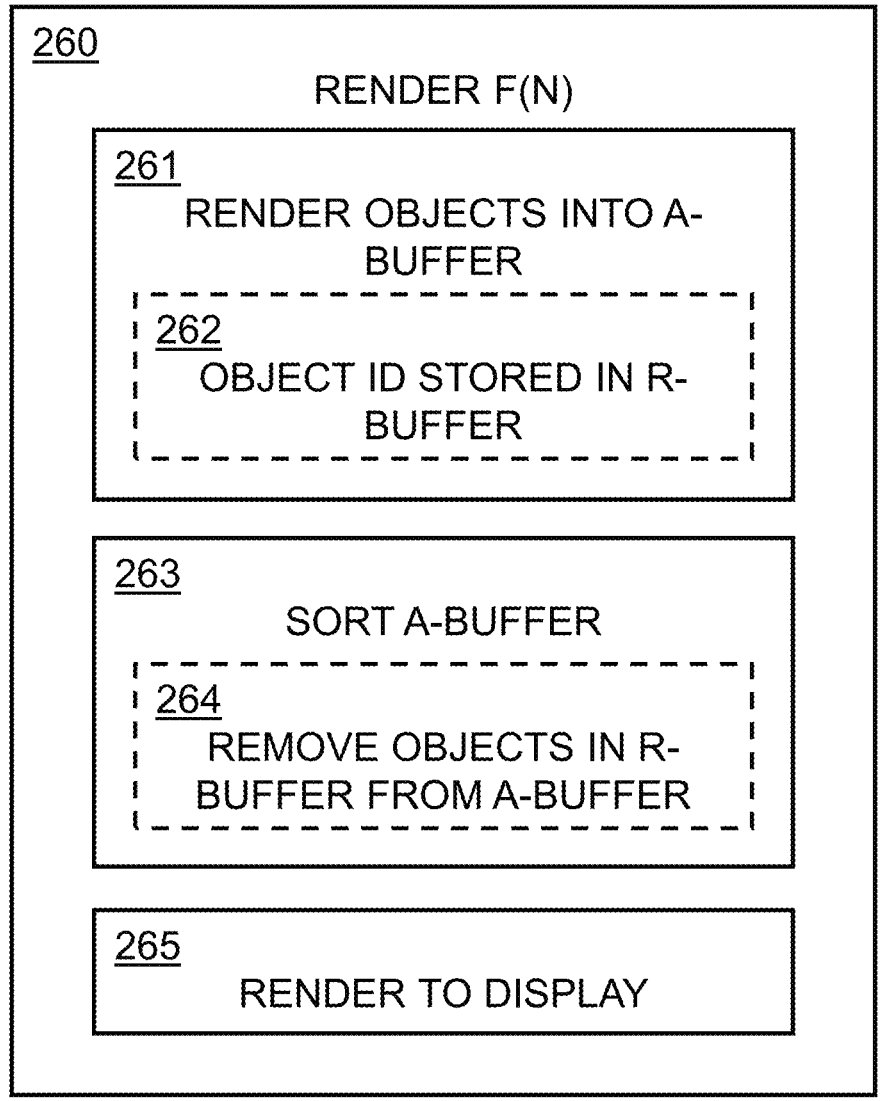

Referring now to FIGS. 2A-2B, a method 200 is described in accordance with one or more embodiments of the present disclosure. The embodiments and the enabling technology described previously herein in the context of the system 100 should be interpreted to extend to the method 200. As may be understood, the steps in the method 200 may be performed iteratively for each frame 116. It is further contemplated that the method 200 is not limited to the system 100.

In a step 210, the CPU 110 may queue one or more objects 118 to be rendered in a frame (N−1) to the GPU 102. As may be understood, the objects to be rendered may generally include any type of object. Although not depicted, the CPU 110 may have sized the A-Buffer for the frame (N−1) based on a previous frame.

In a step 220, the GPU 102 may render the objects in the frame (N−1) by order independent transparency. While the GPU 102 is rendering the frame (N−1), the GPU 102 may determine the size of the A-Buffer needed for a next frame (N). If the A-buffer is not large enough at this time, then an R-Buffer is used to avoid artifacts. Otherwise, all objects fit within the A-buffer and that is all that is needed to pass the size for the frame (N).

In a step 230, the GPU 102 may provide various information for the frame (N−1) to the CPU 110. The size gets sent from the GPU 102 to the CPU 110 during frame (N−1). The CPU 110 doesn't use the information from frame (N−1) until the CPU 110 is on frame (N). For example, if the system is rendering at 60 frames per second, each frame may be spaced between 16 and 17 milliseconds apart. During the middle of frame (N−1), the GPU 102 renders the frame (N−1), determines an A-buffer size for frame (N−1), and passes the A-Buffer size to the CPU 110. The CPU 110 doesn't need the size information until the beginning of frame (N) which may be up to 16 milliseconds later. The delay before needing the size information may be a sufficient amount of time for the GPU 102 to compute the size. The frame (N−1) has already been rendered and the size of the A-buffer is also known. The GPU 102 sends the size of the A-buffer to the CPU 110 as a message in the step 230. The CPU 110 then stores the message for future use. The CPU 110 continues to queue commands to the GPU 102 until all commands have been issued for the frame (N−1). The CPU 110 may receive the size of the A-buffer during or after the time the GPU is rendering. For example, the CPU 110 may receive the size of the A-Buffer for the frame (N−1) during the frame (N). The CPU 110 may take the size information from the previous frame and store the information in memory to be accessed after the CPU 110 has finished queuing commands.

In a step 240, the CPU 110 may allocate the size of the A-Buffer for frame (N). The size of memory allocated to the A-Buffer 108 may be dynamically performed by the CPU 110 based on data from the previous frame, such as, but not limited to, the size of the previous A-Buffer. The data from the previous frame may provide an approximation for the size of the current A-Buffer. The CPU 110 may not wait on the size of the A-buffer when starting a frame (N). Thus, the CPU 110 uses older information from the previous frame because the CPU 110 does not need to synch with the GPU 102. The A-buffer is thus sized based on the previous frame. If the current size of the A-Buffer is less than the size obtained from frame (N−1), then the A-Buffer is resized. Otherwise, the A-Buffer does not need to be resized.

In a step 250, the CPU 110 may queue one or more objects 118 to be rendered in a frame (N) to the GPU 102. As may be understood, the objects to be rendered may generally include any type of object. The objects 118 may include additional objects from the previous frame, such that the A-Buffer for the frame (N) may be too small and one or more of the objects may be partially stored.

In a step 260, the GPU 102 may render the objects in the frame (N) by order independent transparency. The step 260 may be further understood by reference to FIG. 2B, where, if the A-buffer is not large enough, the GPU 102 uses the R-Buffer 108 to remove partially stored objects and thereby prevent artifacts.

In a step 270, the GPU 102 may provide various information for the frame (N) to the CPU 110 for sizing a next frame (N+1).

Referring now in particular to FIG. 2B, the step 260 of rendering the frame (N) is described, in accordance with one or more embodiments of the present disclosure. The steps 260 may include one or more optional steps of using the R-Buffer to prevent partially stored objects from being drawn.

In a step 261, the GPU 102 may render the objects 118 into the A-Buffer 106. The A-Buffer 106 includes the objects from the previous frame. The GPU 102 may then add the objects to the A-Buffer. The GPU 102 may know the current size of the A-Buffer 106 and the size of the new objects being rendered into the A-Buffer. In some instances, the A-Buffer does not include sufficient memory for storing the new objects, such that the objects are partially stored.

In an optional step 262, the object IDs associated with the partially stored objects within the A-Buffer 106 are stored in the R-Buffer.

In a step 263, the objects in the A-Buffer are sorted based on depth data. The number of objects to be sorted may be counted. The objects may then be sorted using any sorting technique known in the art, such as, but not limited to, an insertion sort adapted for the GPU 102 known as register sort.

In an optional step 264, the object IDs stored in the R-Buffer 108 are used to remove the partially stored objects from the A-Buffer. For example, the partially stored objects may be removed prior to sorting. The A-Buffer may then be sorted. Various modifications may be made to the point at which the partially stored objects are removed from the A-Buffer. For example, the partially stored objects in the A-Buffer may be removed after sorting. However, removing the partially stored objects prior to sorting may be beneficial in reducing the number of objects to be sorted.

In a step 265, the GPU 102 blends the sorted objects in the A-Buffer to generate a frame and renders the frame to the display 112. The GPU 102 may blend the sorted objects by any method known in the art. By removing the partially stored objects from the A-Buffer in the step 264, the partially stored objects may be prevented from being drawn in the step 265, thereby introducing one frame of latency. When rendering a next frame, the GPU 102 may provide the information for the current frame to the CPU for increasing the size of the A-Buffer and causing the objects to be fully drawn.

The method 200 described may exhibit significant improvements over prior techniques for A-Buffer memory allocation. For example, the method 200 may exhibit between a four to six millisecond improvement in rendering each frame with order independent transparency. Such improvement may be primarily based on removing the GPU-to-CPU synch points. The improved time may come at an expense of a memory overhead for the R-Buffer and a one frame latency. The one frame latency may be a delay for seeing the partially stored objects (commonly, newly generated objects). The latency may provide a minimal impact as the frame rate increases (e.g., to 60 FPS or more), where the latency occupies a relatively shorter duration of each second. Where the step 264 is not performed, there may be no latency for drawing the partially stored objects. However, the partially stored objects may only be partially drawn on the frame which may introduce noticeable artifacts.

Referring generally to FIGS. 3A-4C, one or more examples of the frames 116 rendered by the display 112 are described. The frames are generated by dynamically allocating the A-Buffer 106. As may be understood, the number of frames and the content of the frames may be dependent on a use case of the display 112 and are not intended to be limiting. The frames may generally include any number of transparent objects which are provided in any order. Such transparent objects may be a rasterized pixel representation based on primitives including any color, opacity, depth value, depth gradient, and the like. Furthermore, the transparent objects depicted are not intended to be limiting, but are merely provided for illustration.

Figure 3A:
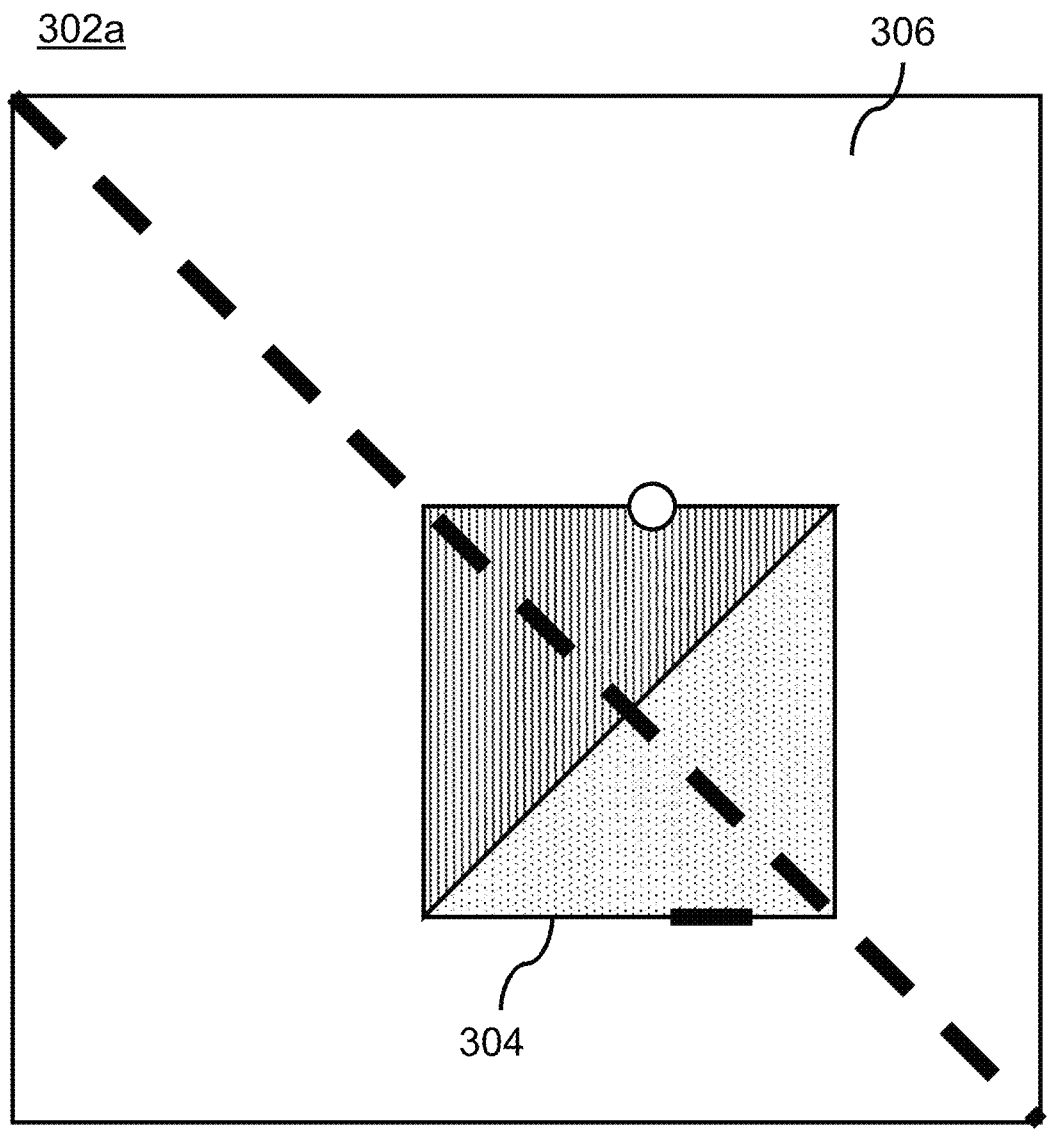
FIG. 3A depicts a frame including transparent objects which have been successfully rendered, in accordance with one or more embodiments of the present disclosure.
Figure 3B:
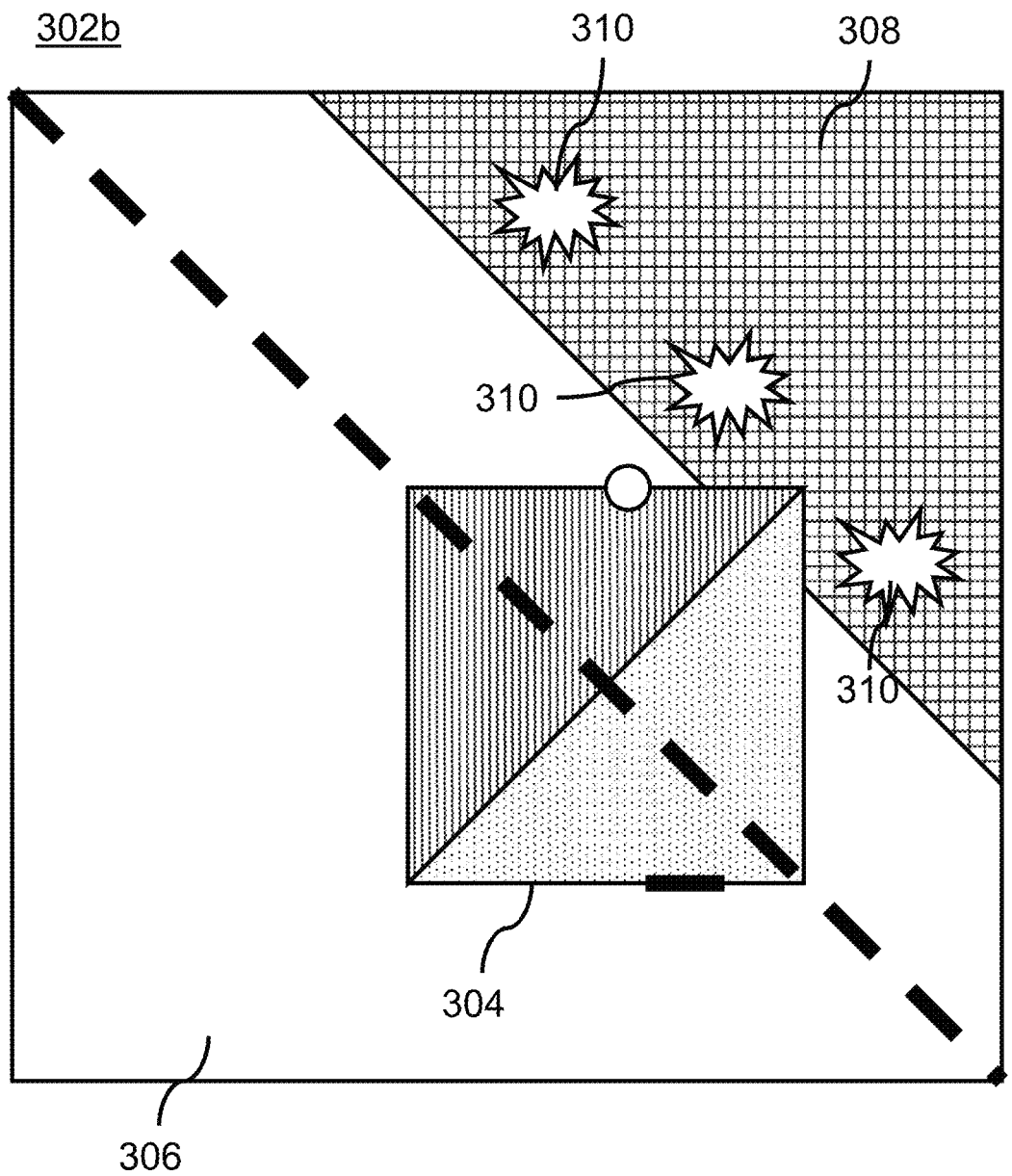
FIG. 3B depicts a frame including artifacts introduced due to one of the transparent objects exceeding an allocated size of an A-Buffer, in accordance with one or more embodiments of the present disclosure.
Figure 3C:
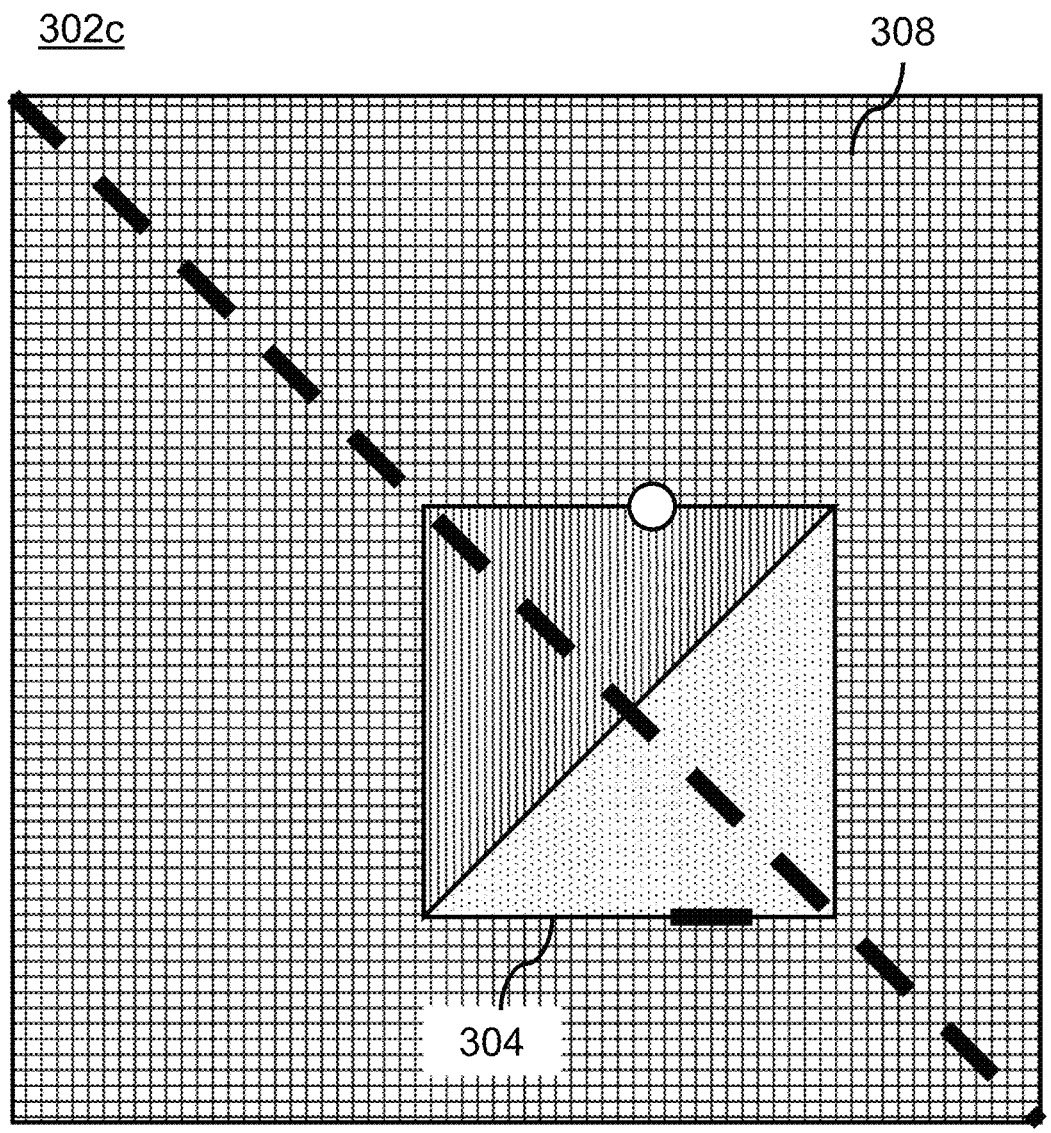
FIG. 3C depicts a frame including transparent objects which have been successfully rendered, in accordance with one or more embodiments of the present disclosure.

Referring now to FIG. 3A-3C, frames 302a, 302b, 302c are described. The frames 302 may be provided in sequence. The frame 302a may be a first frame, the frame 302b may be a second frame, and the frame 302c may be a third frame. The frames 302 may indicate rendering transparent objects on a display while dynamically allocating memory to an A-Buffer without the use of an R-Buffer or without removing partially stored transparent objects.

The frame 302a may include one or more transparent objects disposed at one or more depths. The ordering of the depth transparent objects and the transparency values for the objects may impact the frame to be rendered. For example, the frame 302a may include a transparent object 304 disposed at a first depth. The frame 302a may also include one or more transparent objects 306 disposed behind the transparent object 304. The ordering of the objects may be based on depth data of the associated primitive. In some instances, the transparent objects 306 may be a background. The frame 302a may also include one or more non-transparent objects.

The frame 302b may follow the frame 302a in sequence as the frames are displayed. In the frame 302b, a transparent object 308 is newly generated based on a change in the environment. The transparent object 308 may be a new background or another object which may occupy a substantial portion of the A-Buffer. For example, the new background may occur as the display changes between one or more of a ground and a sky. Due to a size of the transparent object 308, the transparent object 308 may exceed the storage capacity allocated to the A-Buffer 106 and only a portion of the transparent object 308 is stored. In this example, the GPU 102 may not remove the transparent objects which are partially stored in the A-Buffer 106 and may not include the R-Buffer 108. The transparent object 308 which is partially stored may introduce artifacts 310 into the frame 302b. As depicted, the transparent object 308 was stored as a partial triangle with a number of the artifacts 310. The artifacts 310 may be introduced based on the transparent object 308 and/or how the GPU stores the transparent object 310 in the A-Buffer, such that the artifacts 310 are not intended to be limiting.

The frame 302c may follow the frame 302b. Here, the A-buffer 106 has been allocated sufficient memory to store the entire portion of the transparent object 308. The transparent object 308 now is fully stored in the A-buffer 106 and accurately displayed such that the artifacts 310 are removed. Undesirably, the artifacts 310 may create a flickering effect on the display as the frames 302a-302c are display. In some cases, the flickering effect is more noticeable than failing to display the transparent object 308 in the frame 302b.

Figure 4A:
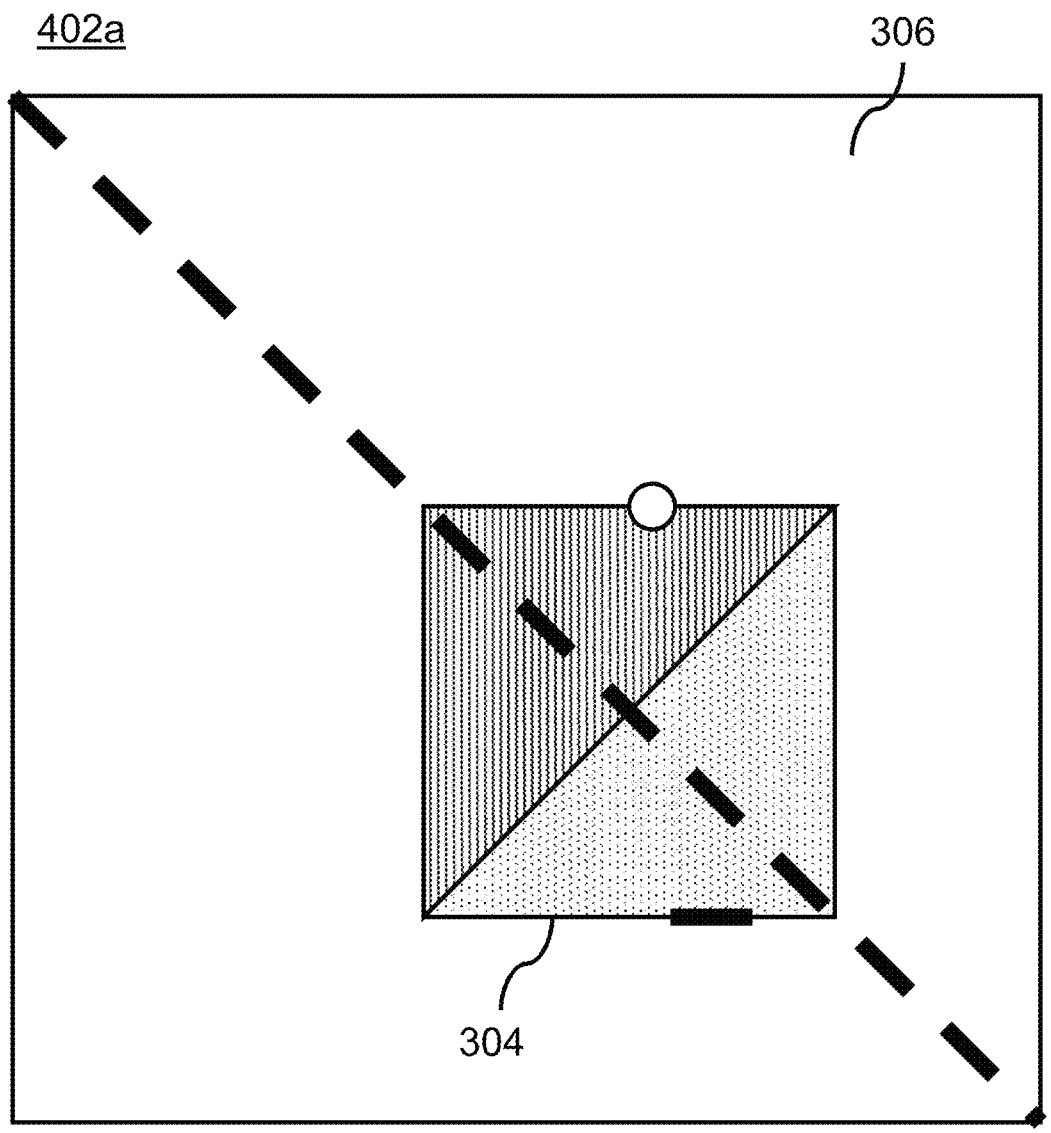
FIG. 4A depicts a frame including transparent objects which have been successfully rendered, in accordance with one or more embodiments of the present disclosure.
Figure 4B:
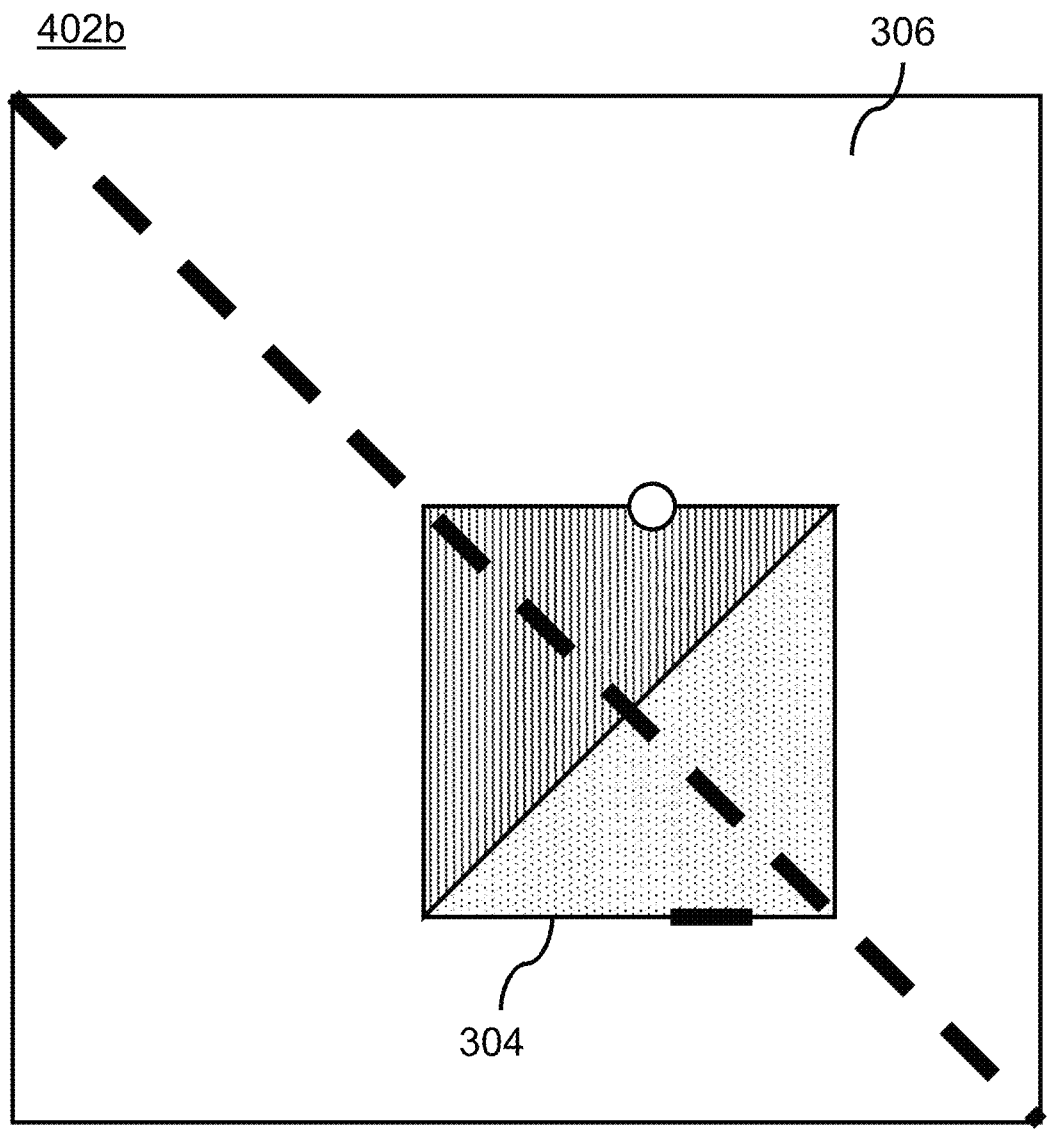
FIG. 4B depicts a frame including transparent objects where one of the transparent objects has exceed an allocated size of an A-Buffer and is not rendered, in accordance with one or more embodiments of the present disclosure.
Figure 4C:
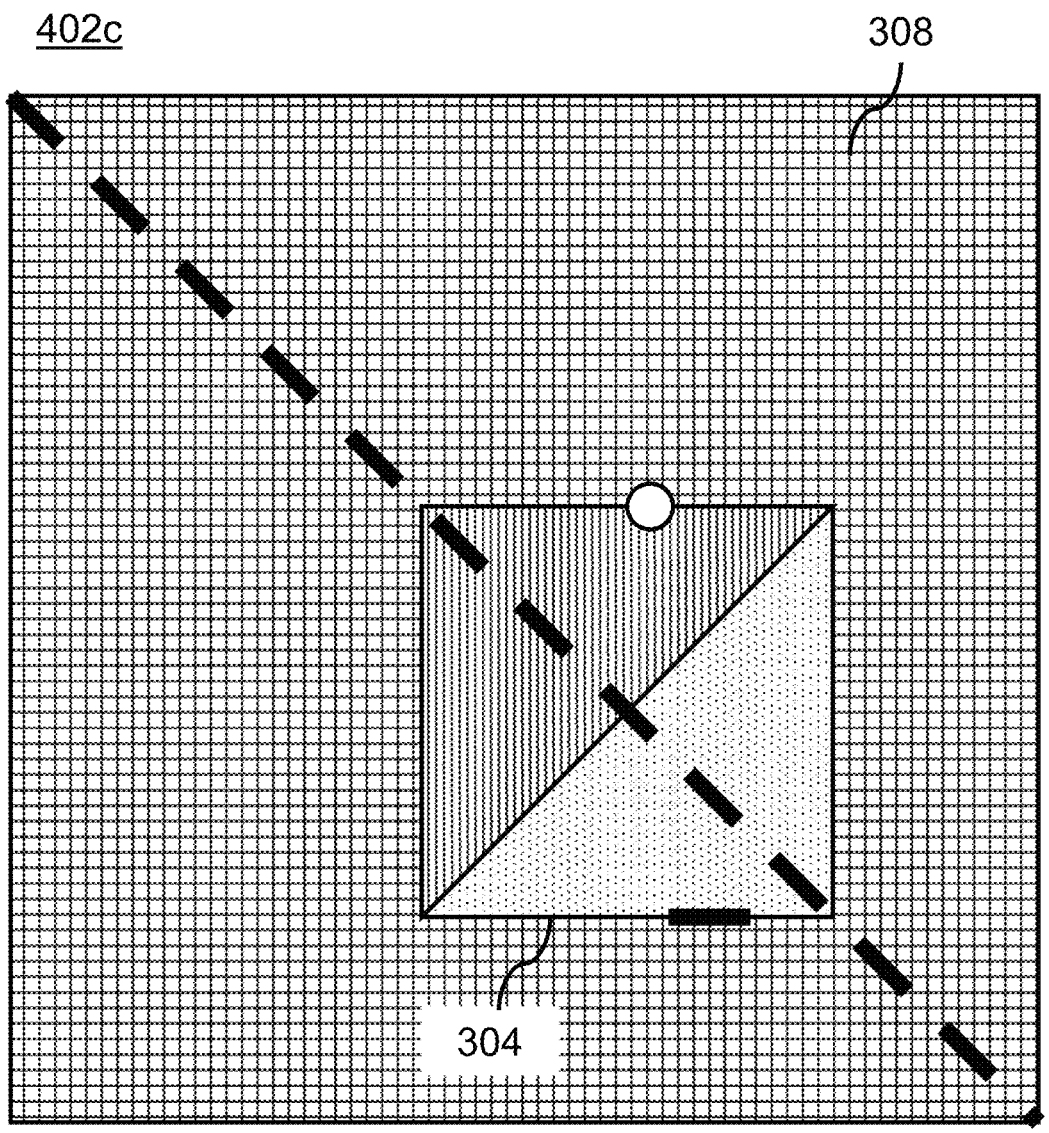
FIG. 4C depicts a frame including transparent objects which have been successfully rendered, in accordance with one or more embodiments of the present disclosure.

Referring now to FIG. 4A-4C, frames 402a, 402b, 402c rendered on the display 112 are described. The frames 402 may be provided in sequence. The frame 402a may be a first frame, the frame 402b may be a second frame, and the frame 402c may be a third frame. FIGS. 4A-4C may be similar to FIGS. 3A-3C, with the exception that the frames 402 may indicate rendering transparent objects on a display while dynamically allocating memory to an A-Buffer with the use of an R-Buffer for removing partially stored transparent objects. In frame 402b, the transparent object 308 has been partially stored in the A-buffer 106 and an identification (i.e., object ID) of the transparent object 308 has been stored in the R-Buffer 108. The transparent object 308 is then removed from the A-Buffer 106 when rendering the frame 402b on the display, such that the transparent object 308 is not drawn. A size of the A-Buffer 106 is then increased such that the transparent object 308 is fully stored in the A-buffer 106 and is displayed in the frame 402c. Thus, the transparent object 308 may be displayed without artifacts, at a cost of a one-frame delay.

Figure 5:
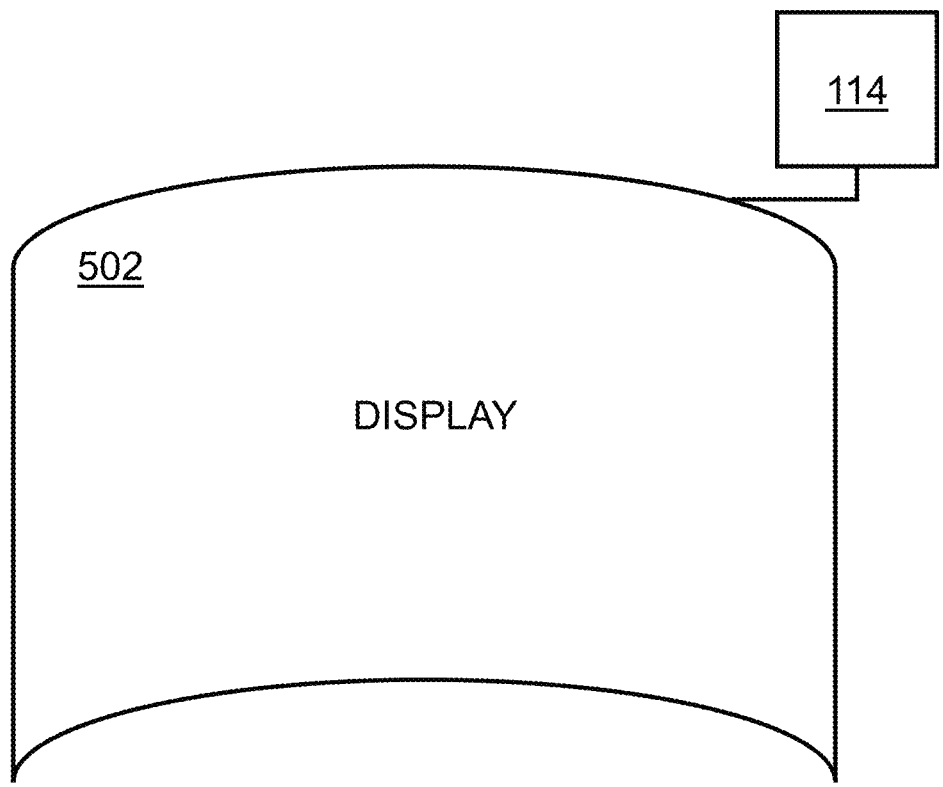
FIG. 5 depicts a simplified perspective view of a flight simulator, in accordance with one or more embodiments of the present disclosure.

Referring now to FIG. 5, an exemplary embodiment of the system 100 as a simulator is described, in accordance with one or more embodiments of the present disclosure. The system may be used to simulate an aircraft or another vehicle. For example, the simulator may be a flight simulator 500. The flight simulator 500 may mimic one or more portions of an aircraft-in flight such as a view through a window of an environment together with various displays present within the aircraft. In some instances, the window, the displays, or another portion of the simulation include one or more transparent objects which are rendered by the various techniques described herein. The frames may be displayed on a display 502 (e.g., the display 112), such as by an image projection or another technique by a digital light processing display or the like. An operator may then view the frames on the display 502 from a viewing platform as the operator executes various simulation maneuvers. In some instances, the display 502 may include a number of transparent objects which may benefit from the techniques described herein, such as, but not limited to, text, buttons, horizons, and other objects commonly displayed on a flight display. As may be understood, the configuration depicting the flight simulator 500 is not intended to be limiting but is merely provided for illustration of utilizing the system in flight simulation contexts. However, the embodiments and the enabling technology described in the context of dynamic memory allocation may be particularly beneficial in the context of flight simulator applications, where it is desirable to render frames in real time with order independent transparency as accurately as possible to mimic the conditions present on a flight deck.

Referring generally again to FIGS. 1A-5. The GPU 102 described herein may use any graphics pipeline known in the art. Additionally, the GPU 102 and the CPU may include any interface known in the art, such as, but not limited to OpenGL, Direct3D, CUDA, and the like. The computing device 114 may similarly include any computing device, such as, but not limited to, a general-purpose computer, including any number of components known in the art, such as, but not limited to, a motherboard, a random-access memory, a memory drive (e.g., solid state drive, hard drive, etc.), a GPU, a CPU, one or more interfaces, a power supply, and the like.

Further, it is noted herein the display 112 may include any display device known in the art. For example, the display device may include, but is not limited to, a liquid crystal display (LCD), a light-emitting diode (LED) based display, an organic light-emitting diode (OLED) based display, an electroluminescent display (ELD), a plasma display panel (PDP), a display light processing (DLP) display, or the like. Those skilled in the art should recognize that a variety of display devices may be suitable for implementation in the present invention and the particular choice of display device may depend on a variety of factors.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A method comprising:
   queuing, by a centralized processing unit (CPU), a first rendering command for a first plurality of objects;
   causing a graphics processing unit (GPU) to store rasterized data of the first plurality of objects into a first A-Buffer, sort the first A-Buffer, and render a first frame based on the first A-Buffer; wherein the centralized processing unit is free to process other commands while the GPU is rendering the first frame;
   allocating, by the CPU, a size of a second A-buffer based on the size of the first A-Buffer from the first frame; wherein the CPU receives the size of the first A-buffer from the GPU during the second frame and determines the size for the second A-buffer such that the GPU does not wait for the size of the second A-Buffer during the second frame;
   queuing, by the CPU, a second rendering command for a second plurality of objects;
   causing the GPU to store rasterized data of the second plurality of objects into a second list stored in the second A-buffer, store an identification of one or more objects of the second plurality of objects into a removed buffer (R-buffer) when the one or more objects are partially stored in the second A-Buffer, sort the second list, and render a second frame using the second sorted list; wherein the CPU is free to process one or more other commands while the GPU is rendering the second frame; wherein the one or more objects of the second plurality of objects are removed from the second A-Buffer prior to rendering the second frame.

2. The method of claim 1, wherein the second plurality of objects are rendered into the second A-Buffer in a single pass without the GPU requesting the CPU to increase the size of the second A-Buffer and without re-rendering the one or more objects of the second plurality of objects.

3. The method of claim 1, wherein the GPU renders the second frame to a display by blending the second list after the second list has been sorted.

4. The method of claim 3, wherein the GPU removes the partially stored objects from the second A-Buffer prior to sorting the list based on the object identifications stored in the R-Buffer.

5. The method of claim 1, wherein the CPU retrieves the size of the first A-Buffer from the GPU.

6. The method of claim 5, wherein the second A-Buffer is allocated the size prior to the GPU rendering the second plurality of objects.

7. The method of claim 6, wherein the CPU retrieves the size of the first frame from the GPU during the first frame and stores the size of the first frame in memory for accessing the size of the first frame once the CPU has finished queuing commands for the first frame.

8. The method of claim 1, wherein the second plurality of objects are rendered into the second A-Buffer by order independent transparency (OIT).

9. The method of claim 8, wherein the second A-buffer is a per-pixel list with one or more pixels which are rasterized from the second plurality of objects.

10. The method of claim 9, wherein one or more of the second plurality of objects include a transparency value and a depth value.

11. The method of claim 10, wherein the GPU renders one or more of the second plurality of objects into the second A-Buffer in parallel.

12. A system comprising:
a graphics processing unit (GPU) including memory;
a centralized processing unit (CPU); and
a display;
wherein system is configured to:
queue, by the CPU, a first rendering command for a first plurality of objects;
cause the GPU to store rasterized data of the first plurality of objects into a first A-Buffer in the memory, sort the first A-Buffer, and render a first frame to the display based on the first A-Buffer; wherein the CPU is free to process one or more other commands while the GPU is rendering the first frame;
allocate, by the CPU, a size of a second A-buffer based on the size of the first A-Buffer from the first frame; wherein the CPU receives the size of the first A-buffer from the GPU during the second frame and determines the size for the second A-buffer such that the GPU does not wait for the size of the second A-Buffer during the second frame;
queue, by the CPU, a second rendering command for a second plurality of objects; and
cause the GPU to store rasterized data of the second plurality of objects into a second list stored in the second A-buffer in the memory, store an identification of one or more objects of the second plurality of objects into a removed buffer (R-buffer) when the one or more objects are partially stored in the second A-Buffer, sort the second list, and render a second frame using the second sorted list; wherein the CPU is free to process one or more other commands while the GPU is rendering the second frame; wherein the one or more objects of the second plurality of objects are removed from the second A-Buffer prior to rendering the second frame.

13. The system of claim 12, wherein the second plurality of objects are rendered into the second A-Buffer in a single pass without the GPU requesting the CPU to increase the size of the second A-Buffer and without re-rendering the one or more objects of the second plurality of objects.

14. The system of claim 12, wherein the memory comprises a video random access memory.

15. The system of claim 14, wherein a number of object IDs together with a byte ID size for the R-Buffer is selected to fit within a cache size of the video random access memory.

16. The system of claim 15, wherein the cache size is between 32 bytes and 512 bytes; wherein the byte ID size is 4 bytes; wherein the number of object IDs is between 8 and 128.

17. The system of claim 12, wherein the display comprises a digital light processing display configured to render the first frame and the second frame by image projection.

18. The system of claim 17, wherein the second plurality of objects include a heads-up display of a flight simulator.

19. The system of claim 12, wherein the system is configured to display a plurality of frames on the display at a frame rate.

20. The system of claim 12, wherein the system includes a computing device including the CPU and the GPU.

* * * * *